(12) United States Patent
Angelsmark et al.

(10) Patent No.: US 12,536,062 B2
(45) Date of Patent: Jan. 27, 2026

(54) DECENTRALIZED MONITORING OF APPLICATION FUNCTIONALITY IN A COMPUTING ENVIRONMENT

(71) Applicant: Telefonaktiebolaget LM Ericsson (publ), Stockholm (SE)

(72) Inventors: Ola Angelsmark, Ystad (SE); Fredrik Svensson, Löberöd (SE); Joakim Persson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 18/282,338

(22) PCT Filed: Mar. 29, 2021

(86) PCT No.: PCT/EP2021/058155
§ 371 (c)(1),
(2) Date: Sep. 15, 2023

(87) PCT Pub. No.: WO2022/207067
PCT Pub. Date: Oct. 6, 2022

(65) Prior Publication Data
US 2024/0160521 A1     May 16, 2024

(51) Int. Cl.
*G06F 11/00*     (2006.01)
*G06F 11/07*     (2006.01)

(52) U.S. Cl.
CPC ...... *G06F 11/0793* (2013.01); *G06F 11/0709* (2013.01); *G06F 11/0757* (2013.01)

(58) Field of Classification Search
CPC ............ G06F 11/0793; G06F 11/0709; G06F 11/0757; G06F 11/079; G06F 11/3089; G06F 11/327
See application file for complete search history.

(56) References Cited

U.S. PATENT DOCUMENTS

| | | |
|---|---|---|
| 9,477,790 B2 | 10/2016 | Liddicott |
| 10,313,221 B1 | 6/2019 | Leonard |
| 2019/0312746 A1 | 10/2019 | Myers, III et al. |
| 2020/0026787 A1 | 1/2020 | Alam |
| 2020/0204882 A1 | 6/2020 | Gang et al. |

OTHER PUBLICATIONS

PCT International Search Report, mailed Jan. 5, 2022, in connection with International Application No. PCT/EP2021/058155, all pages.

(Continued)

*Primary Examiner* — Katherine Lin
(74) *Attorney, Agent, or Firm* — Murphy, Bilak & Homiller, PLLC

(57) ABSTRACT

An application in a computing environment is monitored by configuring an instance of a first application function in the computing environment; configuring an instance of an application function monitor in the computing environment; and activating the application function monitor response to an activation of the first application function. The instance of the first application function and the instance of the application function monitor operate independently of one another when activated, and the application function monitor, when activated, monitors one or more of: a continued functioning of the activated first application function; and an output produced by the activated first application function.

23 Claims, 15 Drawing Sheets

(56) References Cited

OTHER PUBLICATIONS

PCT Written Opinion, mailed Jan. 5, 2022, in connection with International Application No. PCT/EP2021/058155, all pages.
Norris, M. et al., "IoTRepair: Systematically Addressing Device Faults in Commodity IoT", 2020 IEEE/ACM Fifth International Conference on Internet-of-Things Design and Implementation (IoTDI), 2020, pp. 142-148.
Chanthakit, S. et al., "MQTT Based Air Quality Monitoring System using NodeMCU and Node-RED", 2018 Seventh ICT International Student Project Conference (ICT-ISPC), IEEE, Jul. 11, 2018, 5 pages.
Rajan, V. et al., "Machine Fault Diagnostics and Condition Monitoring Using Augmented Reality and IoT", Proceedings of the Second International Conference on Intelligent Computing and Control Systems (ICICCS 2018), Jun. 14, 2018, pp. 910-914.
Matic, M. et al., Health Monitoring and Auto-Scaling RabbitMQ Queues within the Smart Home System, 2019 IEEE 9th International Conference on consumer Electronics (ICCE-Berlin), Sep. 8, 2019, pp. 380-384.
Hunkeler, U. et al., "MQTT-S—A Publish/Subscribe Protocol For Wireless Sensor Networks", Communication Systems Software and Middleware and Workshops, 2008, 3rd International Conference, IEEE, Jan. 6, 2008, 8 pages.

DECENTRALIZED MONITORING OF APPLICATION FUNCTIONALITY IN A COMPUTING ENVIRONMENT

BACKGROUND

The present invention relates to technology that monitors functionality (e.g., with respect to operational status, correct functionality, error handling, etc.) of an application in a computing environment, and more particularly to decentralized monitoring of application functionality with error handling actions performed at a site of application failure.

In distributed systems, especially in cyber physical systems such as industrial Internet of Things (IoT) systems which interact with physical machines and processing, an important part of running an application is monitoring its functionality and infrastructure to ensure it is functioning properly, and handling the errors and problems that arise during its lifetime.

In conventional distributed systems, monitoring and error handling are typically done in an ad hoc fashion, either being implemented by the developer(s) as an integral part of the application itself, or else handled on a higher level by a framework or execution environment.

The latter solution is, by necessity, coarse and only allows for the handling of the most generic cases, while the former allows for handling any desired granularity of monitoring and error handling, but most often is a single, tailored implementation having little or no possibility for reuse in other domains.

And none of the above approaches provides a generic way to provide implementations of monitoring and error handling that are tailor-made for individual hosts/runtimes.

There is therefore a need for technology that addresses the above described and/or related problems.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Moreover, reference letters may be provided in some instances (e.g., in the claims and summary) to facilitate identification of various steps and/or elements. However, the use of reference letters is not intended to impute or suggest that the so-referenced steps and/or elements are to be performed or operated in any particular order.

In accordance with one aspect of the present invention, the foregoing and other objects are achieved in technology (e.g., methods, apparatuses, nontransitory computer readable storage media, program means) in which an application in a computing environment is monitored by configuring an instance of a first application function in the computing environment; configuring an instance of an application function monitor in the computing environment; and activating the application function monitor in response to an activation of the first application function. The instance of the first application function and the instance of the application function monitor operate independently of one another when activated, and the application function monitor, when activated, monitors one or more of: a continued functioning of the activated first application function; and an output produced by the activated first application function.

In an aspect of some but not necessarily all embodiments, the first application function is use of a resource that is provided in the computing environment.

In another aspect of some but not necessarily all embodiments, the resource is a sensor.

In yet another aspect of some but not necessarily all embodiments, the computing environment is a distributed environment comprising a first client and a second client that communicate with one another via a messaging system; and the first application function and application function monitor are activated in the first client of the computing environment.

In still another aspect of some but not necessarily all embodiments, the messaging system is a message broker.

In another aspect of some but not necessarily all embodiments, the application function monitor periodically monitors receipt of a heartbeat signal from the messaging system, wherein the heartbeat signal indicates the continued functioning of the activated first application function.

In yet another aspect of some but not necessarily all embodiments, the application function monitor starts a watchdog timer; restarts the watchdog timer in response to a receipt of the heartbeat signal from the messaging system; and activates a first error handling procedure in response to a timeout being indicated by the watchdog timer.

In still another aspect of some but not necessarily all embodiments, an importance level is associated with the first application function; and a timeout value of the watchdog timer is set in dependence on the importance level of the first application function.

In another aspect of some but not necessarily all embodiments, the first application function communicates data to a second application function via the messaging system, wherein the second application function is activated in the second client; and the application function monitor receives the communicated data from the messaging system.

In yet another aspect of some but not necessarily all embodiments, the application function monitor detects when the received data differs from predefined acceptable data, and activates a second error handling procedure in response to said detecting.

In still another aspect of some but not necessarily all embodiments, the first application function is a sensor function.

In another aspect of some but not necessarily all embodiments, the computing environment is a distributed computing environment, the first client is associated with a first node of the distributed computing environment, and the second client is associated with a second node of the distributed computing environment.

BRIEF DESCRIPTION OF THE DRAWINGS

The objects and advantages of the invention will be understood by reading the following detailed description in conjunction with the drawings in which: Figure TA is a sequence diagram that illustrates an application.

DETAILED DESCRIPTION

Figure 1A:
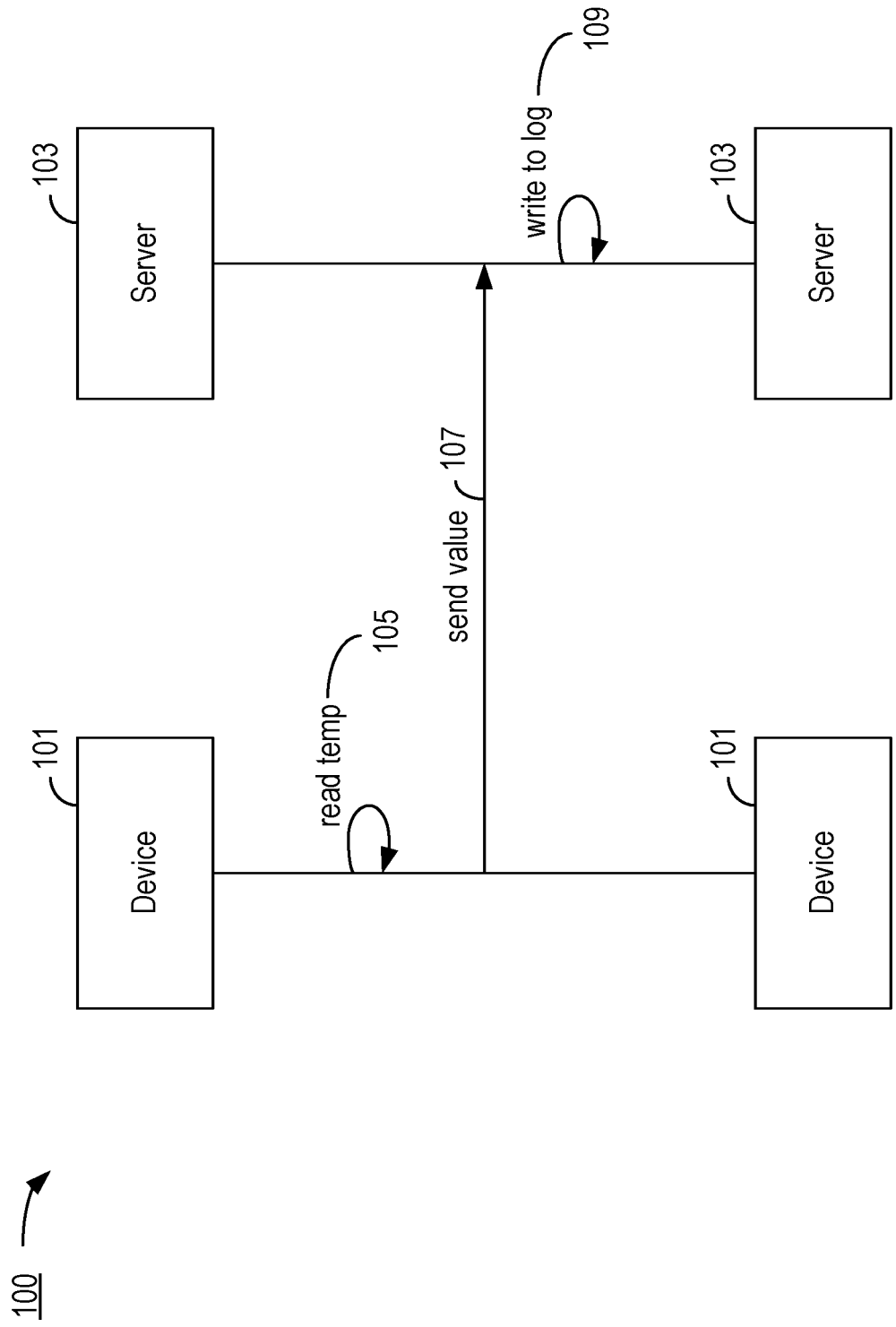
FIGS. 1B and 1C depict a signaling diagram relating to a server communicating a read temperature request to a device, and monitoring activity related thereto.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits alone, one or more programmed processors, or any combination of these). Moreover, the invention can additionally be considered to be embodied entirely within any form of non-transitory computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

An aspect of the herein-described technology enables developers of applications that run on a distributed system to systematically add capabilities for detecting errors and/or anomalies per application component, and for taking the appropriate actions to mitigate, recover, and/or raise awareness of an ongoing incident to other parts of the distributed system. This ability is accomplished, at least in part, through a decoupling of an application's functionality from its monitoring and error recovery/handling in a distributed system. Each service, capability, or functionality can be assigned a monitoring operation and an associated error recovery or error handling functionality which is implemented and included separately from the capability itself. This offers a modular approach to monitoring and error handling, making it possible to reuse these modules for different functionality with little effort.

In another aspect of embodiments consistent with the invention, whenever a distributed application is deployed, each application function or service that is to be monitored is also deployed with its corresponding monitoring functionality and the type of error handling desired.

These and other aspects of embodiments consistent with the invention will now be described in further detail. To begin the discussion, consider an example involving a small distributed application in a computing environment 100 in which a device 101 reads (step 105) a temperature and sends (step 107) it to a server 103. Figure TA is a sequence diagram that illustrates the application.

Despite how small the application is, there are a number of possible issues that will need to be monitored:
1. The correct functioning of the temperature reading to
   a. ensure that it returns at all, and
   b. ensure that it returns a valid temperature.
2. The correct functioning of the communication between the device 101 and the server 103.
3. The correct functioning of the logging operation at the server 103.

To better illustrate aspects of embodiments consistent with the invention, the following first describes how such monitoring is typically done in a conventional, bespoke solution. For simplicity, details about how errors are handled are omitted here.

Figure 1B:
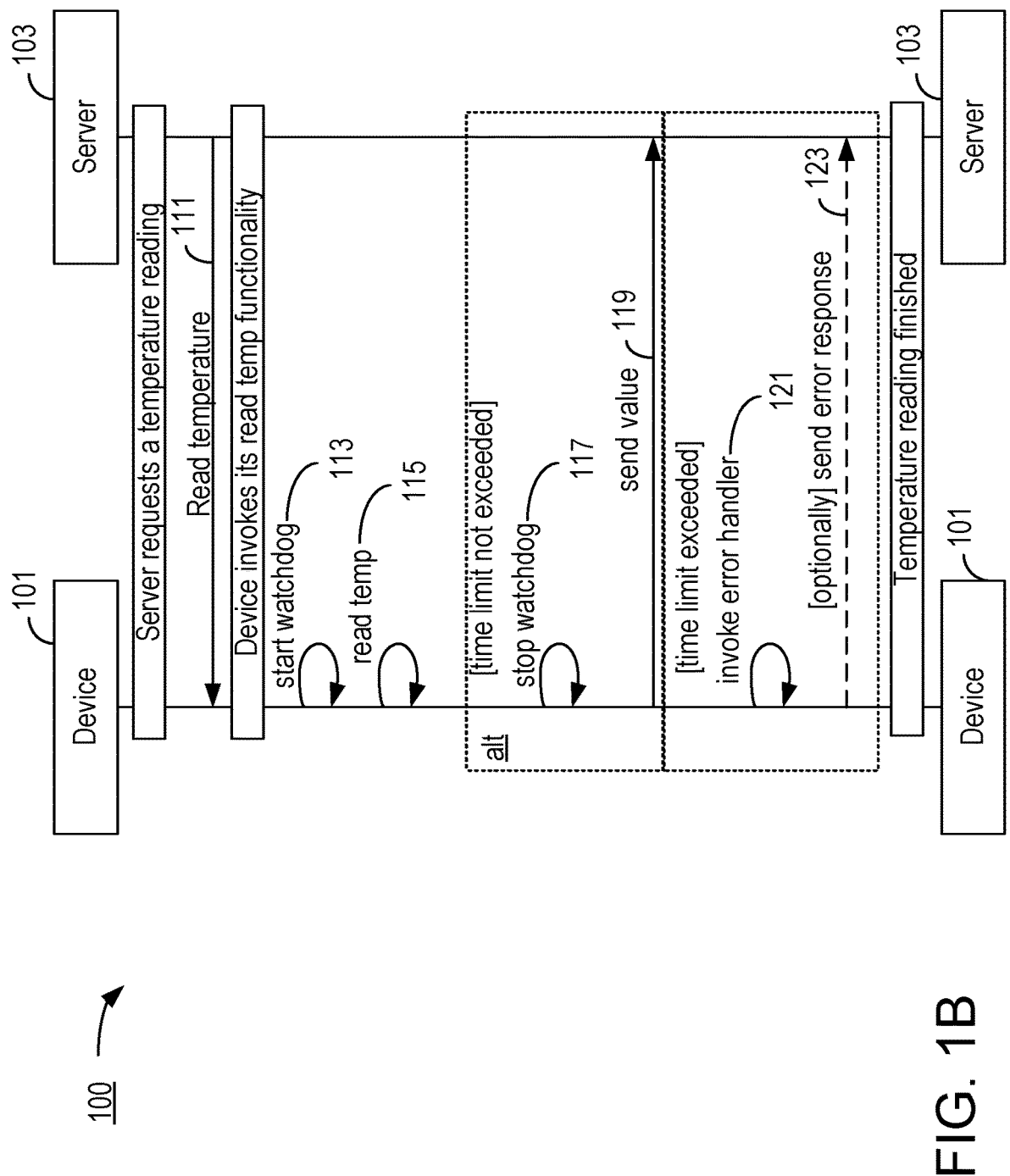

Referring to FIG. 1B, the server 103 communicates a read temperature request (step 111) to the device 101. If it is assumed that the read temperature functionality is a low level function that initiates a measurement and then reads and returns the response after a period of time (a common implementation) the functioning and monitoring at the device 101 would consist of
  starting a watchdog timer (step 113)
  initiating a temperature reading (step 115)
  if a value is returned before expiration of the timer, stopping the timer (step 117) and sending the value to the server 103 (step 119), but if the timer expires before any value is returned, then invoking an error handler (step 121).
    Optionally present in some implementations, the device 101 sends an error response to the server (step 123).

Next, assuming a value is returned within the set time limit, it needs to be verified to make sure it is a valid temperature. For example, the reading can return NaN (Not a Number) in the case of an erroneous read, or the sensor can malfunction and not supply a feasible temperature value as its reading.

In pseudo-code, the algorithm for detecting such errors will look similar to the following:

```
if nan(value) or value < -273.15:
    errorhandler( )
else:
    # continue normal operation
```

This error checking would be executed after each reading event, before sending it.

Figure 1C:
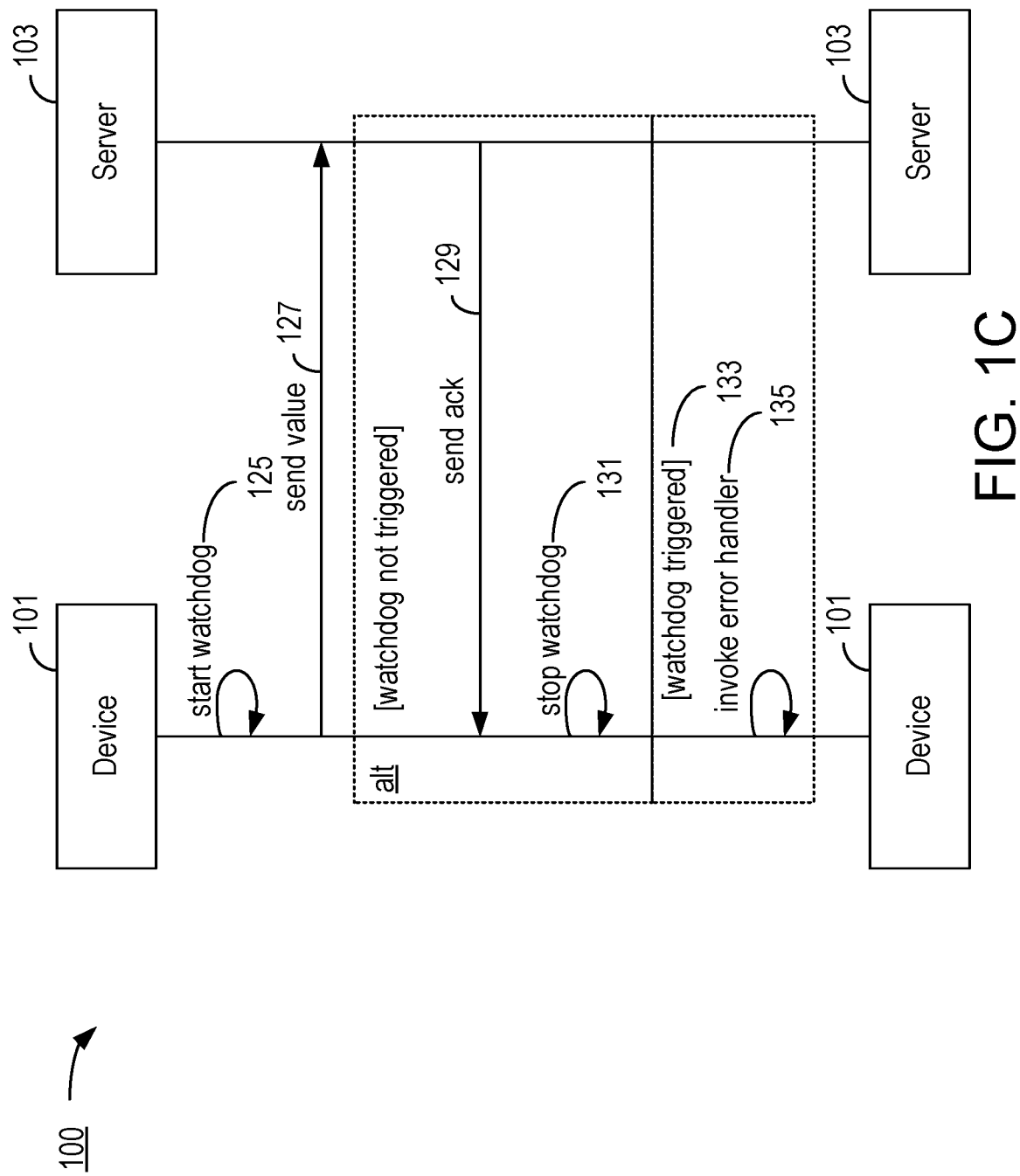

In order to monitor communication functionality at both ends of the communication, there needs to be monitoring functionality on both the device 101 and the server 103. The sequence diagram for the monitoring is shown in FIG. 1C, and depicts the sequence that occurs after the temperature has been read and verified. The device 101 starts a watchdog timer (step 125) and sends the temperature value to the server (step 127). If, before expiration of the watchdog timer, the server 103 sends an acknowledgement message back to the device 101 (step 129) to indicate successful receipt of the temperature value, the device 101 stops its watchdog timer (step 131).

However, if the device's watchdog timer expires (step 133), this is taken as an indication that communication functionality between the device 101 and the server 103 has malfunctioned. Accordingly, the device 101 invokes a corresponding error handler 135 as a response.

On the server side, it is necessary to monitor the logging function to ensure that it has performed correctly. Accordingly, the server 103 performs the following algorithm (written in pseudocode) after writing the message (with the temperature reading) to the log:

```
write_to_log(value)
    if not verify_write(value):
        errorhandler( )
    else:
        # continue normal operation
```

In an aspect of embodiments consistent with the invention, instances of the monitoring functionality are decoupled from the application functions they are monitoring, and inherit their respective locations from these monitored functions. Additionally, the monitoring functions are configured separately, and are automatically started when needed.

In some but not necessarily all embodiments, the application is assigned an importance level to ensure that the right level of error handling is done. This importance level can also be used to determine the values of certain settings, such as but not limited to watchdog timeouts and the like.

To further illustrate these aspects, consider the same small temperature reading application as before. In accordance with aspects of an exemplary embodiment consistent with the invention, and with reference to FIGS. 2A, 2B, 2C, and 2D, a device 201 and a server 203 are configured to operate as follows.

Figure 2A:
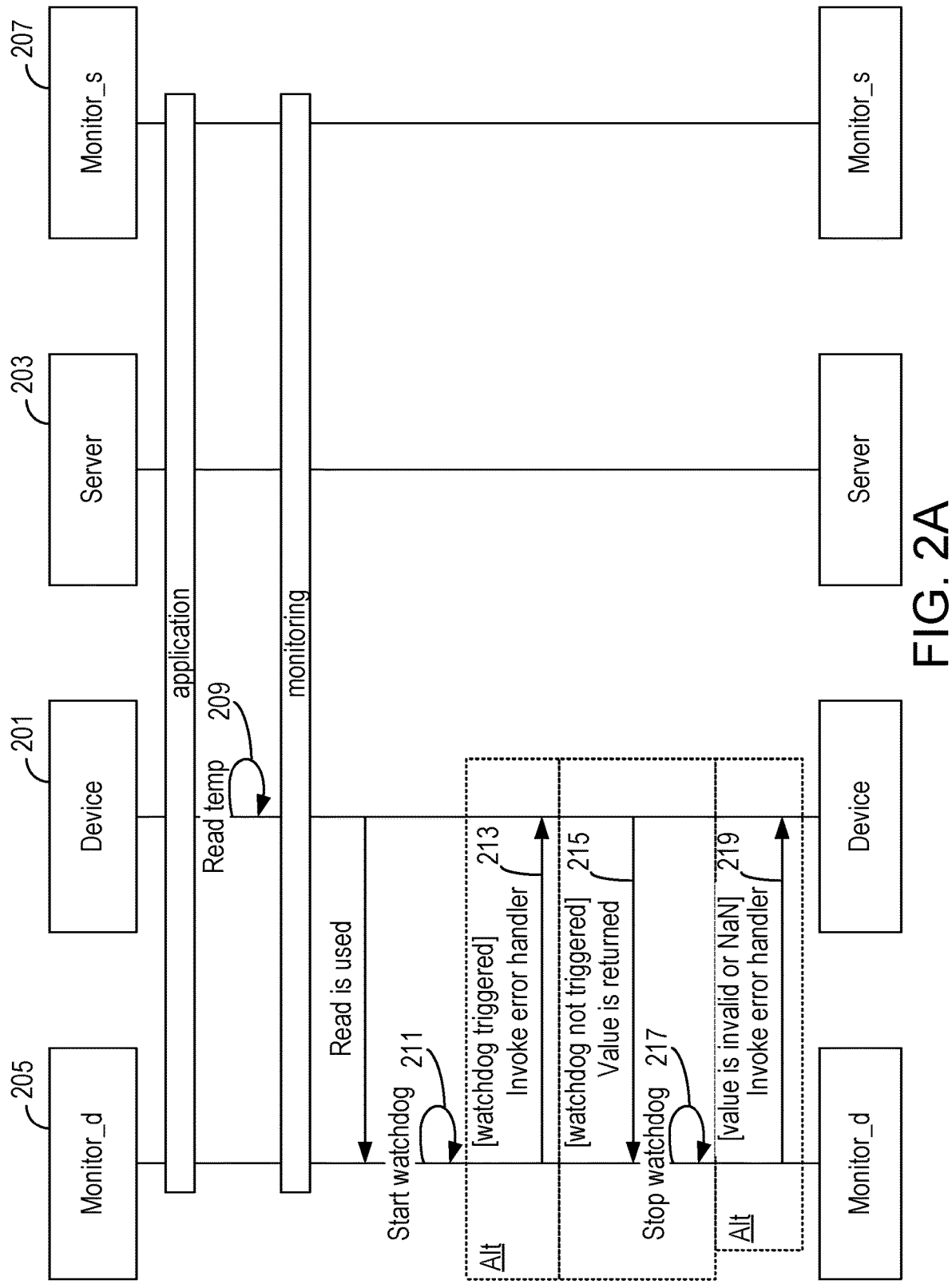
FIGS. 2A, 2B, 2C, and 2D depict a signaling diagram relating to a server communicating a read temperature request to a device, and monitoring activity related thereto in accordance with an exemplary class of embodiments.

As shown in FIG. 2A, a device monitor 205 is configured to monitor functional aspects on the device 201 and is activated when the application function it is to monitor is activated. Similarly, a server monitor 207 is configured to monitor functional aspects on the server 203 and is activated when the application function it is to monitor is activated.

More particularly, when a temperature read function is activated by the application (step 209), the device monitor 205 responds by starting a watchdog timer (step 211). The watchdog timer is configured to issue a timeout event ("watchdog triggered") after expiration of an amount of time within which a temperature reading would have been expected to be received. If a watchdog timeout event does occur, the device monitor 205 causes the device to invoke an error handler (step 213). However, if a temperature value is returned within the monitoring time period, the device monitor 205 is notified of this occurrence (step 215), and the watchdog timer is stopped (step 217) in order to prevent an erroneous triggering.

When a temperature value is returned, it should still be evaluated to determine whether it is proper. As mentioned above, a value can be improper if it is not a number, or if it is a number lying outside an acceptable pre-defined range. Accordingly, if it is determined that the value provided by the temperature read functionality is improper, a corresponding error handler is invoked (step 219).

Figure 2B:
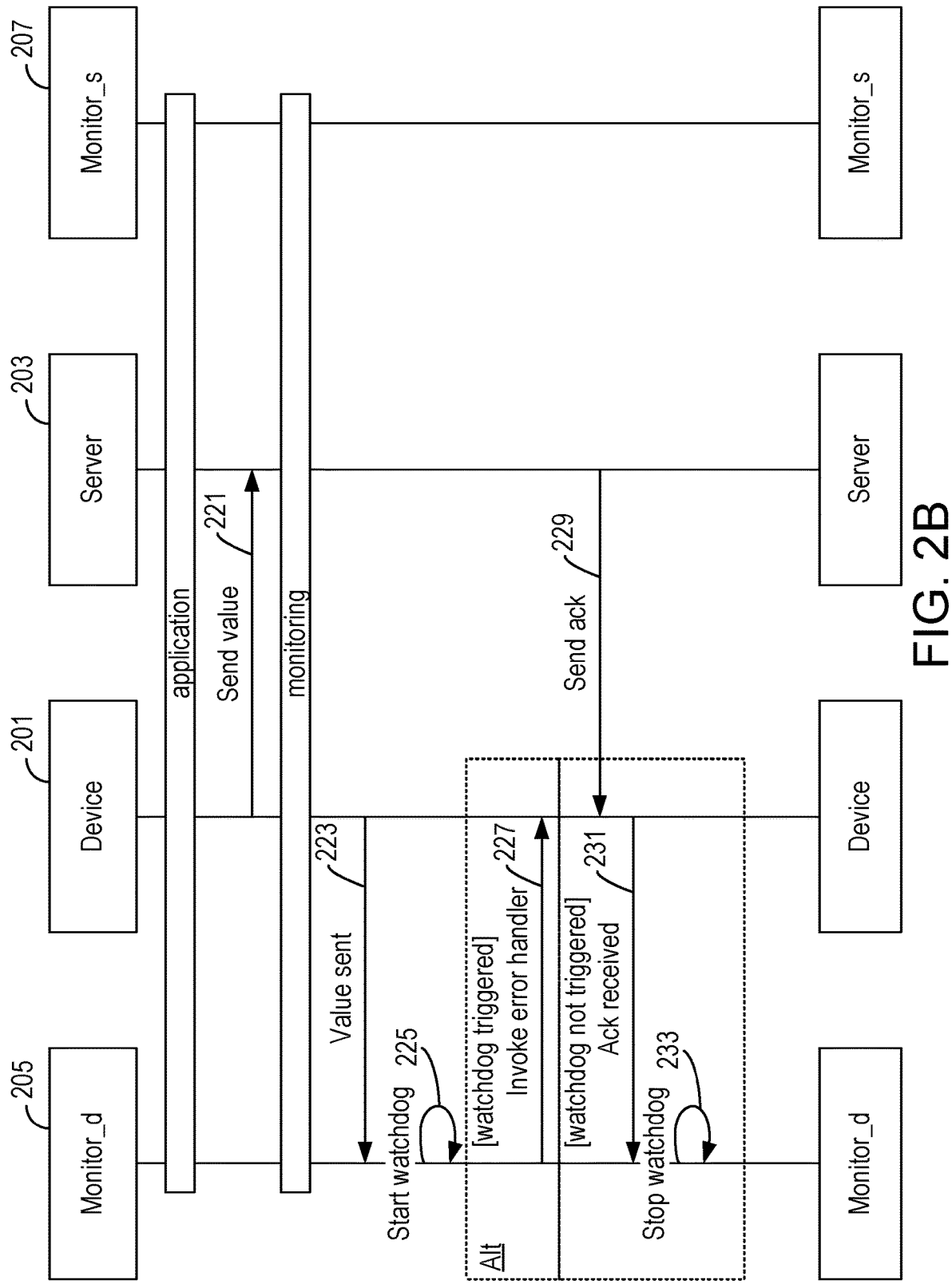

Referring now to FIG. 2B, the device monitor 205 is further configured to monitor the functionality of the device 201 sending the temperature value to the server 203. Therefore, when the device 201 sends a value to the server 203 (step 221), the device monitor 205 is notified (step 223) and this activates communication monitoring. This involves the device monitor 205 starting a watchdog timer (step 225). The watchdog timer is configured to issue a timeout event ("watchdog triggered") after expiration of an amount of time within which the device 201 will have expected receipt of an acknowledgement from the server 203, indicating correct receipt of the communicated temperature value. If a watchdog timeout event does occur, the device monitor 205 causes the device to invoke an error handler (step 227). However, if the device does receive the expected acknowledgement (step 229) and the device monitor 201 is then notified of this (step 231), the watchdog timer is stopped (step 233) in order to prevent an erroneous triggering.

Figure 2C:
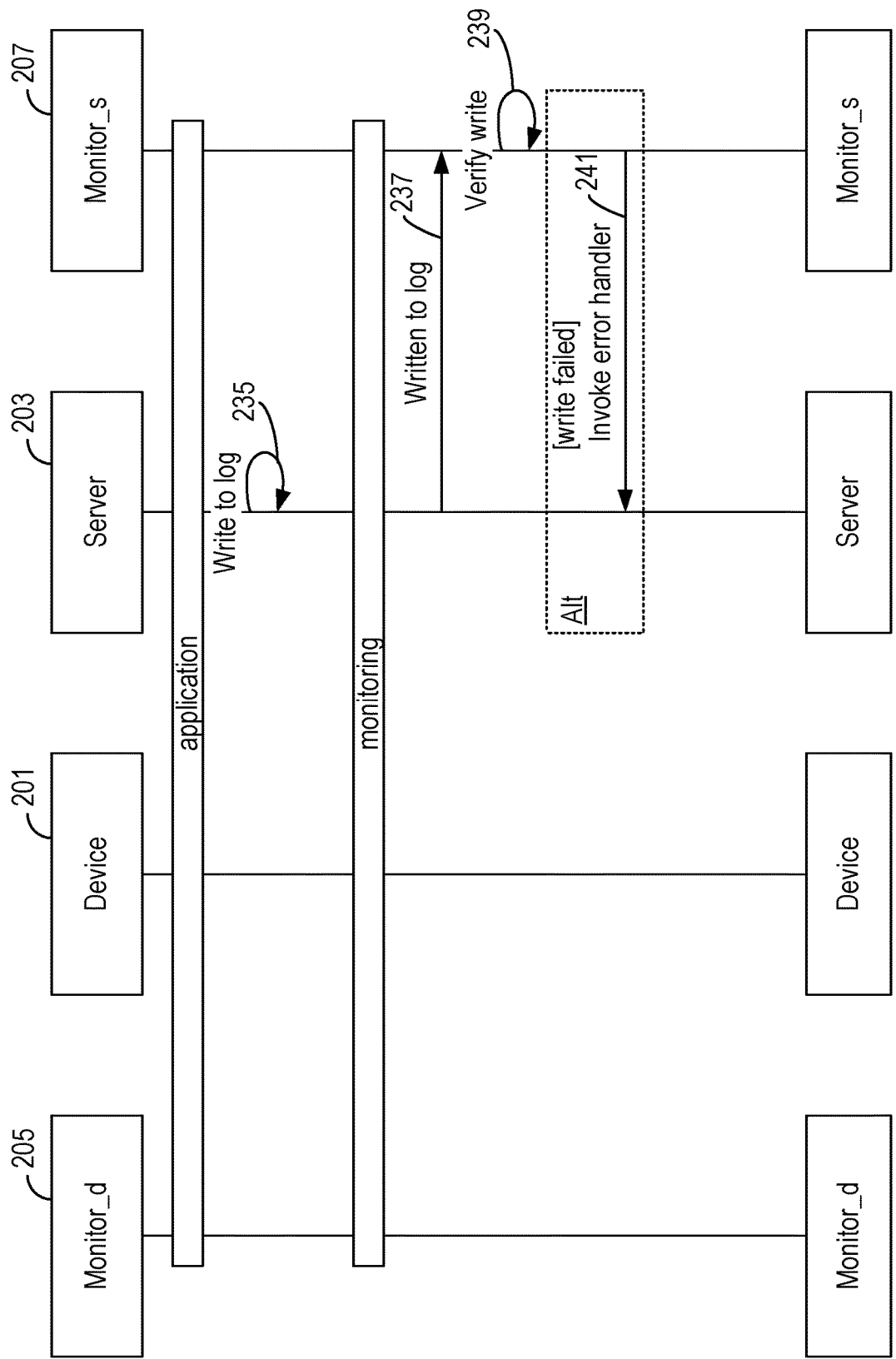
Figure 2D:
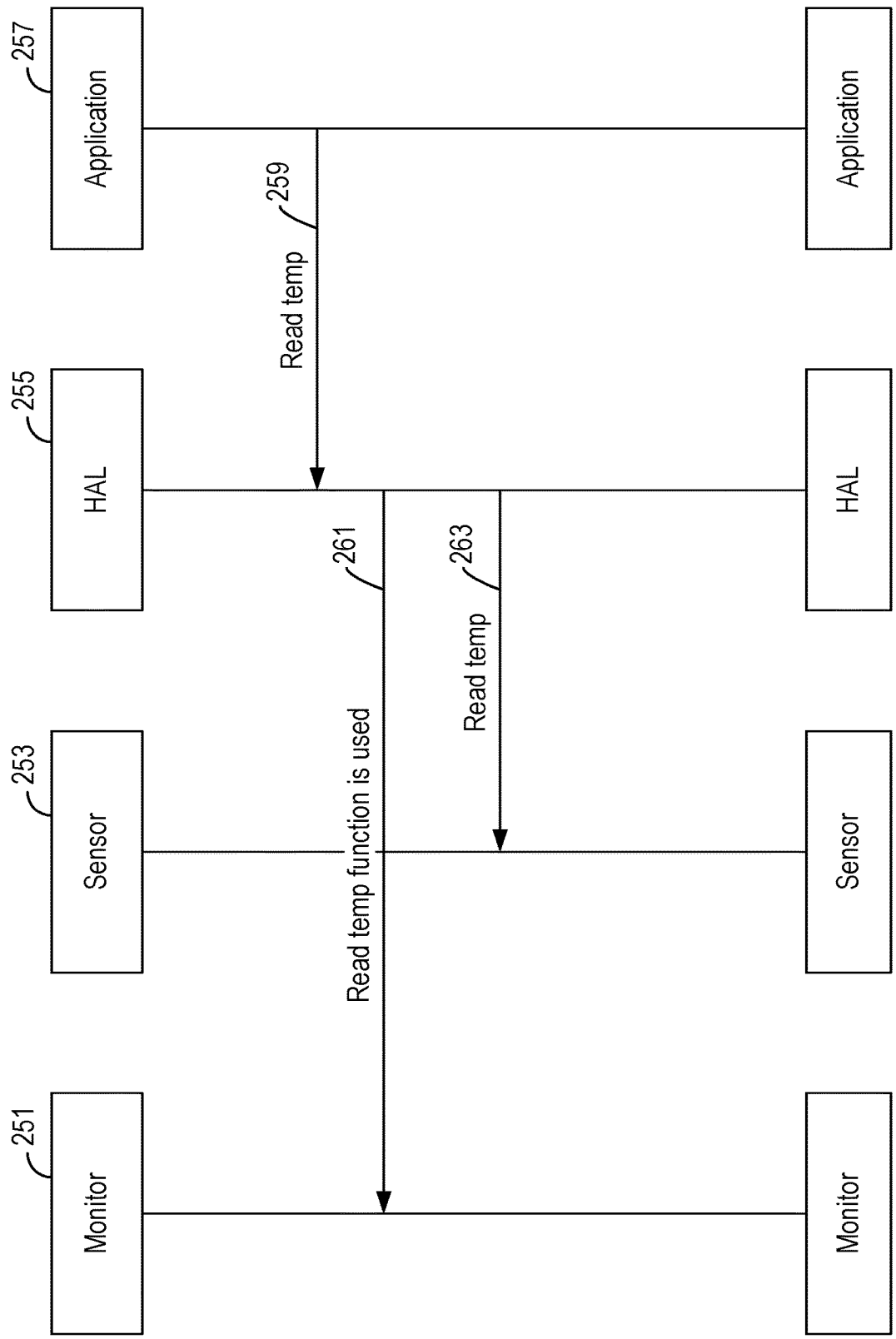

Referring now to FIG. 2C, some of the application's functionality is performed at the server 203. In order to monitor for correct functionality of those features, a server monitor 207 is activated in response to activation of server functions. With respect to the simple temperature reading application example, when the server 203 receives a temperature value from the device 201, it responds with an acknowledgement message (see step 229 in FIG. 2B).

The server 203 also writes the received value to a log (step 235). The server monitor 205 is notified of this write operation (step 237) and the server monitor 205 responds by verifying that the write operation was carried out correctly (step 239). If it detects an error with respect to that function, the server monitor 205 invokes a corresponding error handler (step 241).

A number of the above described aspects involve a monitor being notified when an application function has been performed. It should be understood that this is not a result of the application itself providing that notification; as mentioned earlier, instances of the monitoring functionality are decoupled from the application functions they are monitoring, and the application itself need not be changed or adapted to perform monitoring at all. The mechanism by which the notification occurs is implementation dependent, and will depend on, for example, the operating system or platform that the application is executing on. The computing environment should provide the possibility of listening to, or getting notified of, the low level invocations of functions to be monitored.

For example, the system can provide such notifications when a device driver is used, when a device file is accessed and written to, or similar.

On embedded devices there is often an event system or an event bus that the monitoring can use to determine when the monitored functionality is used.

It is also possible to add notification capability to the hardware abstraction layer (HAL) in order to ensure that decoupled monitoring is available for all functions. A schematic depiction of this class of embodiments is illustrated in the example of FIG. 2D, again involving a temperature sensor read function. In this example, a sensor monitor 251 is instantiated separately from an application 257 that reads a sensor 253. All are running a hardware abstraction layer 255. The application 257 invokes a read temperature functionality (step 259) and this requires interaction with the hardware abstraction layer 255. The hardware abstraction layer 255 responds by notifying (step 261) the monitor 251 that a read temperature function has been activated, and also by interacting (step 263) with the sensor 253 to initiate the read function. The monitoring itself can, in some embodiments, take place as described earlier, making it unnecessary to repeat the description here.

In an alternative class of embodiments, a separate broker or messaging system is provided that can provide for a more flexible implementation since, for example, the monitor can be configured to listen to data from the client (given that it is known which topics the client to be monitored will be publishing on). The discussion will now focus on exemplary embodiments that utilize a messaging system.

Figure 3:
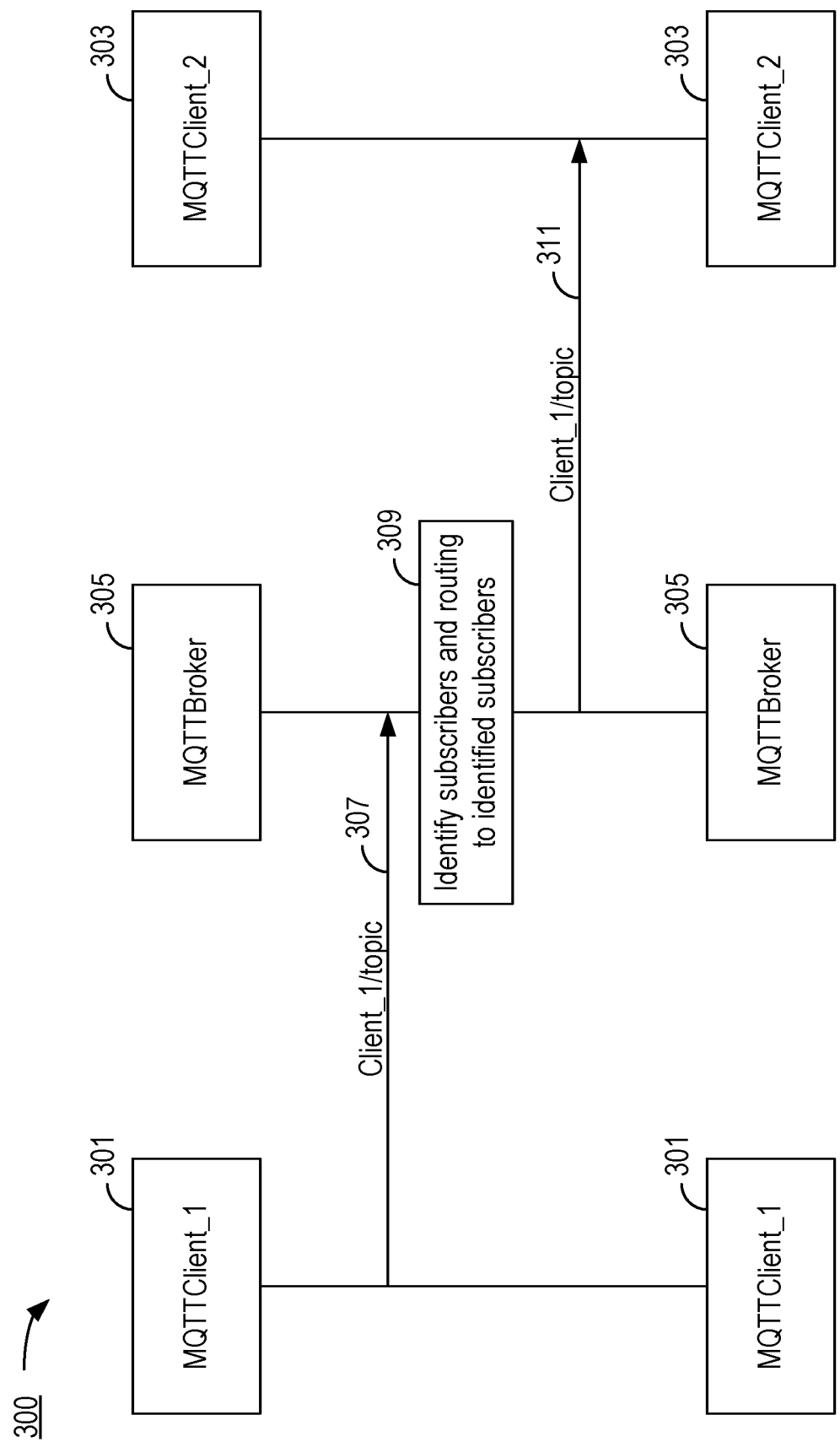
FIG. 3 illustrates an exemplary application in a computing environment, with the application comprising first and second clients that communicate with each other by means of a messaging system.

In another aspect of embodiments consistent with the invention, features of exemplary embodiments as discussed above are applied in a distributed application in which messaging is a core component. Referring to FIG. 3, the application is activated in a computing environment 300. The application comprises first and second clients 301, 303 that communicate with each other by means of a messaging system that, in this nonlimiting example, is a Message Queuing Telemetry Transport (MQTT) system as is known in the art. In brief, MQTT is a publish-subscribe network protocol that transports messages between devices. The MQTT broker 305 is a server that receives all messages from clients in the computing environment 100 (which in this example includes the first and second clients 301, 303) and then routes the messages to the appropriate destination clients. Application-related data flows are exemplified by the first client's "topic" data being communicated from the first MQTT client 301 to the MQTT broker 305 (step 307). The MQTT broker 305 determines which clients within the computing environment 300 have subscribed to data from the first client 301 and the routing to these identified subscribers (step 309). The MQTT broker 305 then communicates the first client's "topic" data to those subscribers. In this example, the second client 303 is a subscriber, so the first client's "topic" data is communicated (step 311) to the second client 303.

Figure 4:
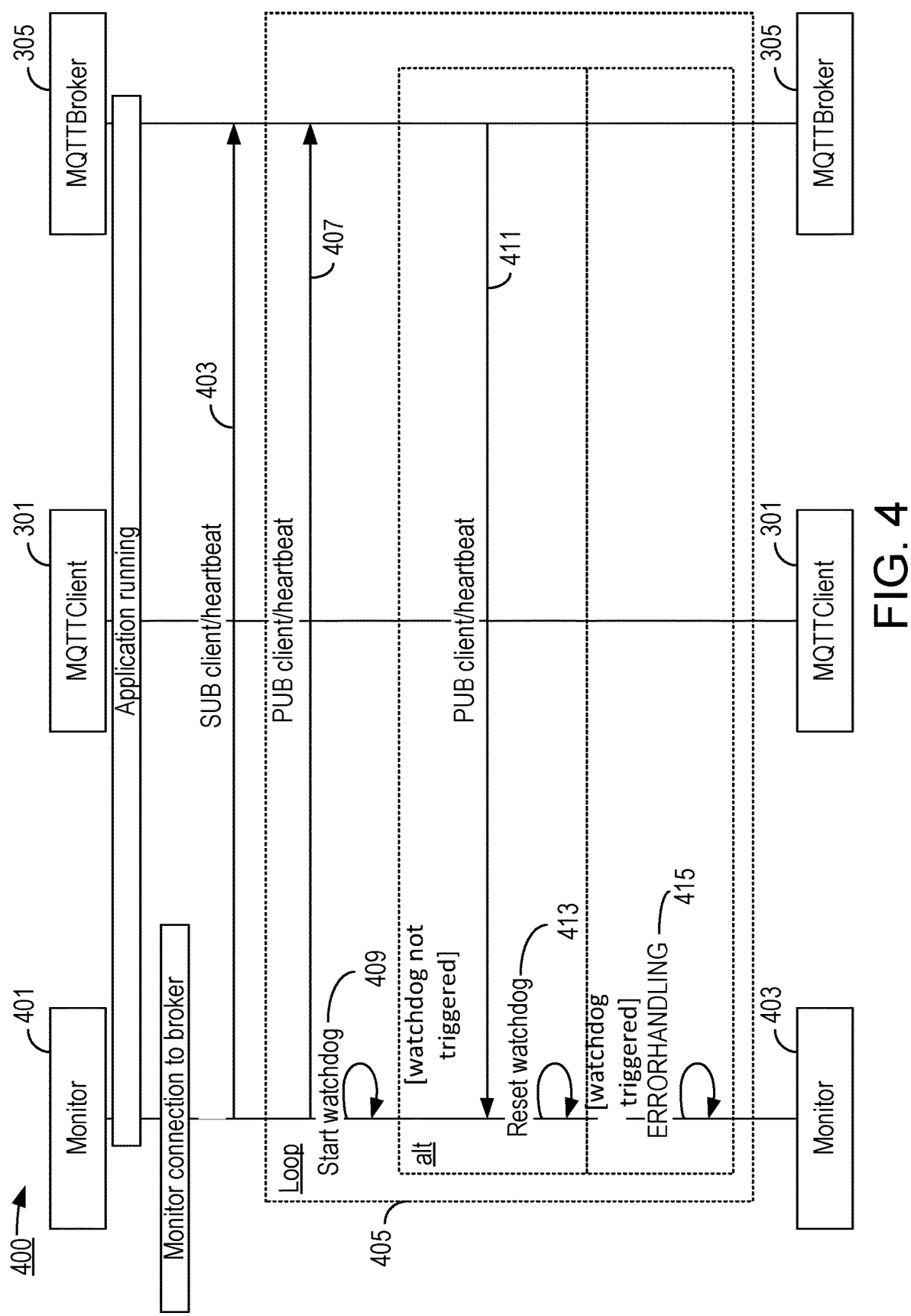
FIG. 4 is a signaling diagram that illustrates the monitoring of a connection between the first client and a broker.

In the example of FIG. 3, there are three connections to monitor: one from client to broker, another from broker to client and a third from client to client. The first two are connectivity-related and can (for example) be handled by a heartbeat and a watchdog timer. FIG. 4 is a signaling diagram that illustrates the monitoring of a connection between the first client 301 and the MQTT broker 305 in a computing environment 400. When the application (and its functionalities to be monitored) is activated, a monitor 401 is also activated in the same node as the MQTT Client 301. The monitoring is initialized by subscribing (step 403) to a topic which, in this example, is "client/heartbeat". The monitoring itself is in the form of a loop 405 in which an activated monitor 401 publishes a heartbeat message (in the form of the above-mentioned topic) to the MQTT broker 305 (step 407). The monitor 401 then starts a watchdog timer (step 409) that counts up or down and issues a timeout when a predetermined count value has been reached. Because the monitor 401 has subscribed to its own published heartbeat message, it knows that it should receive the published copy within a predetermined, system-dependent period of time. The predetermined value of the watchdog timer's count is configured to cause the watchdog timer to expire later than the expected message receipt time.

With this initialization established, the loop 405 processing begins. If the monitor 401 receives the published heartbeat message 411 before the watchdog timer has expired, the connection between the MQTT Client 301 and the MQTT Broker 305 is presumed to be functionally operational, and the watchdog timer is accordingly reset to its initial count value (step 413) and processing continues from the start of the loop 405.

But if the watchdog timer does experience a timeout event, this means that the published heartbeat message was not received as expected, indicating a failure somewhere in the communication path that the monitor 401 shares with the MQTT client 301 (with the path including the MQTT broker 305 itself), so the monitor 401 activates an error handler (step 415). The specifics of the error handler are implementation specific and beyond the scope of this description.

FIG. 4 illustrates how the connection between the first client 301 and the MQTT broker 305 can be monitored. An analogous process can be configured to monitor the connection between the second client 303 and the MQTT broker 305. If, in FIG. 4, one changes all illustrated references to the first client 301 to instead be references to the second client 303, FIG. 4 can then be considered to illustrate the analogous process for monitoring the second client 303.

Figure 5A:
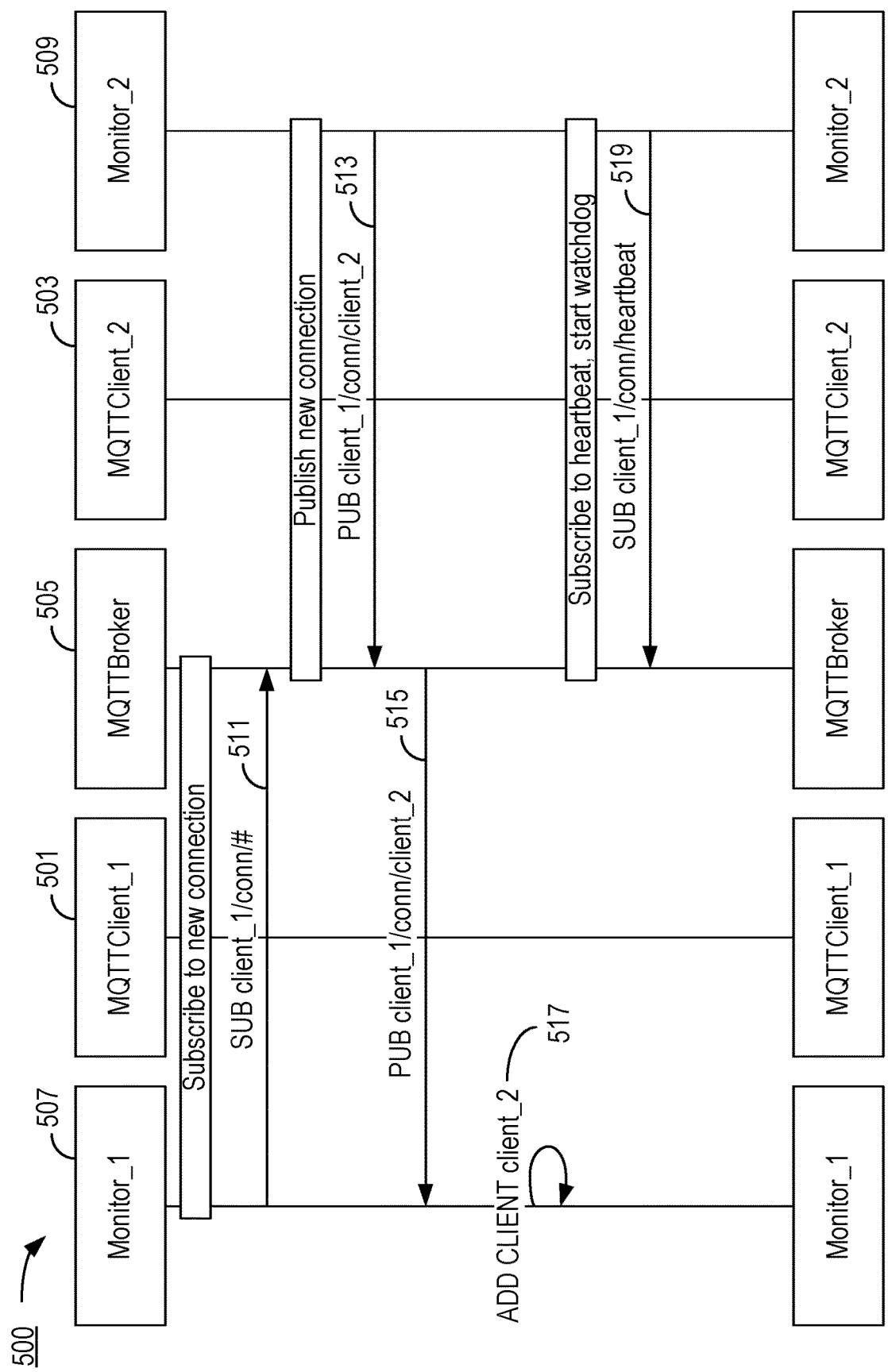
FIGS. 5A, 5B, and 5C are, when taken together, a signaling diagram illustrating an exemplary embodiment consistent with the invention for monitoring an end-to-end connection between a first client and a second client.

As mentioned above, the third connection to be monitored is the end-to-end connection between the first client 301 and the second client 303. This monitoring can be handled in a few different ways. One example is illustrated in the exemplary signaling diagram depicted in FIGS. 5A, 5B, and 5C. In this embodiment, a first client 501 and a second client 503 are configured to cooperatively perform a distributed application. The first and second clients 501, 503 communicate with one another via a messaging system, which in this embodiment employees a broker 505. Functional aspects associated with the first client 501 are monitored by a first monitor 507. Similarly, functional aspects associated with the second client 503 are monitored by a second monitor 509.

It may be the case that the first client 501 will be establishing connections with more than one other client. To account for this possibility, the first monitor 507 communicates (step 511) a message to the broker 505 whereby it subscribes to any published message indicating the first client 501 as a first named participant in a connection (the "#" is treated as a wildcard in this nomenclature). In this example, the second monitor is configured to anticipate that the second client 503 will be engaging in such a connection, so it sends (step 513) a message to the broker 505 publishing the expected connection. Since the first monitor 507 has subscribed to these types of messages, the broker 505 communicates (step 515) the publication message to the first monitor 507. The first monitor evaluates the received message and thereby learns that the second client 503 will be establishing a connection with the first client 501. To ensure that that connection is monitored, the first monitor 507 adds the second client 503 to a list of connections (step 517).

In addition, the second monitor 509 prepares to monitor the connection by subscribing (step 519) to an expected heartbeat message that will be communicated by the first monitor 507.

Figure 5B:
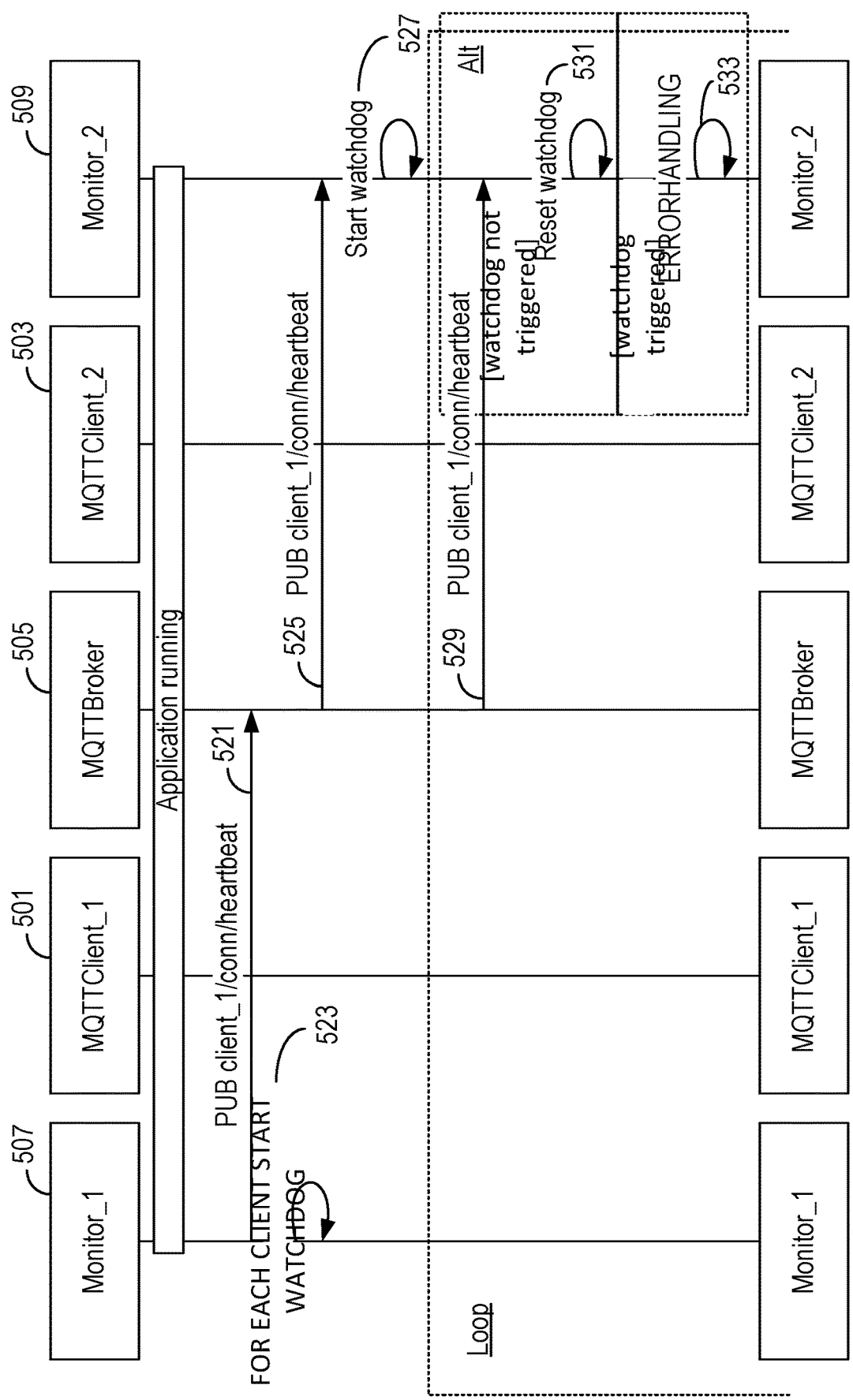

Continuing the discussion now with reference to FIG. 5B, when the application begins running in a computing environment 500 and has established a connection between the first client 501 and the second client 503, the first monitor 507 publishes a heartbeat message (step 521). The first monitor 507 now expects to receive a reciprocal heartbeat message from the clients it knows about, and accordingly starts a watchdog timer for each of those (step 523) so that it will be alerted if one of these messages fails to arrive within an expected period of time.

Any entity that has subscribed to the first client's heartbeat message will receive a copy of the message and in this example the second monitor 509 is one of those entities. Accordingly, the broker 505 forwards (step 525) the first monitor's heartbeat message to the second monitor 509.

The second monitor 509 now expects to receive these heartbeat messages with some regularity, so in order to monitor this the second monitor 509 starts a watchdog timer (step 527) with a timeout period set to expire beyond a period within which the next heartbeat message should have been received. If a next heartbeat message is received prior to expiration of the timer (step 529), the second monitor 509 resets the watchdog timer (step 531) so that it will expire if a next heartbeat is not received within an expected period of time.

However, if the second monitor's watchdog timer does expire, this indicates that an expected heartbeat messages missing. Accordingly, a corresponding error handling routine is triggered (step 533).

Figure 5C:
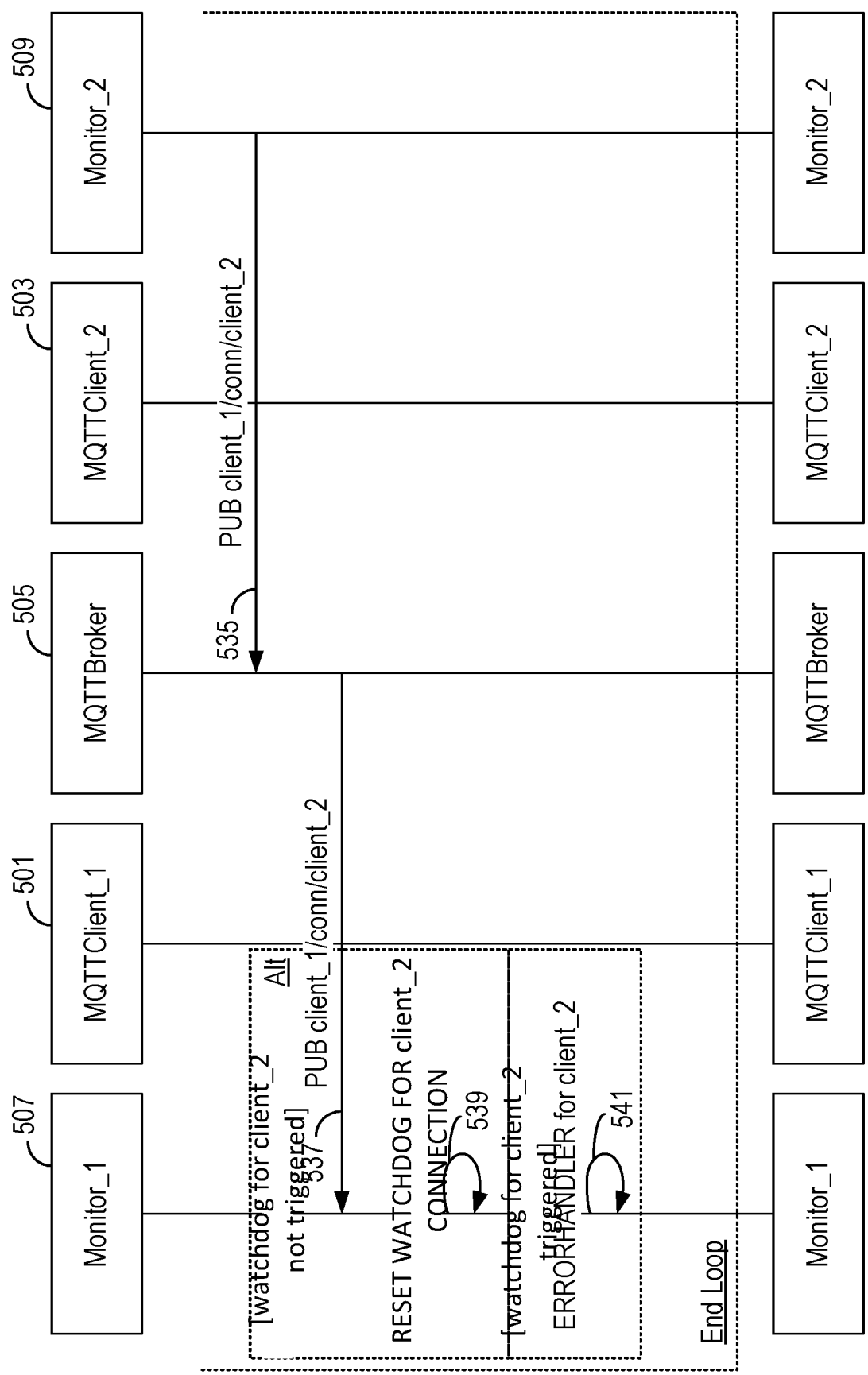

Continuing the discussion now with reference to FIG. 5C, in order to indicate that it is still up and running, the second monitor 509 publishes a message (step 535) indicating that it has a connection with the first client 501. As mentioned earlier, the first monitor 507 has subscribed to all published messages that refer to a connection with the first client 501. Accordingly, the broker 505 forwards the message (step 537) to the first monitor 507. If the first monitor 507 receives step message before expiration of the watchdog timer associated with the second client 503, it resets its watchdog timer (step 539) so that it will expire if a next message referring to the second client 503 is not received within an expected period of time.

However, if the first monitor's watchdog timer does expire, this indicates that an expected message making reference to the second client 503 is missing. Accordingly, a corresponding error handling routine is triggered (step 541).

Figure 6:
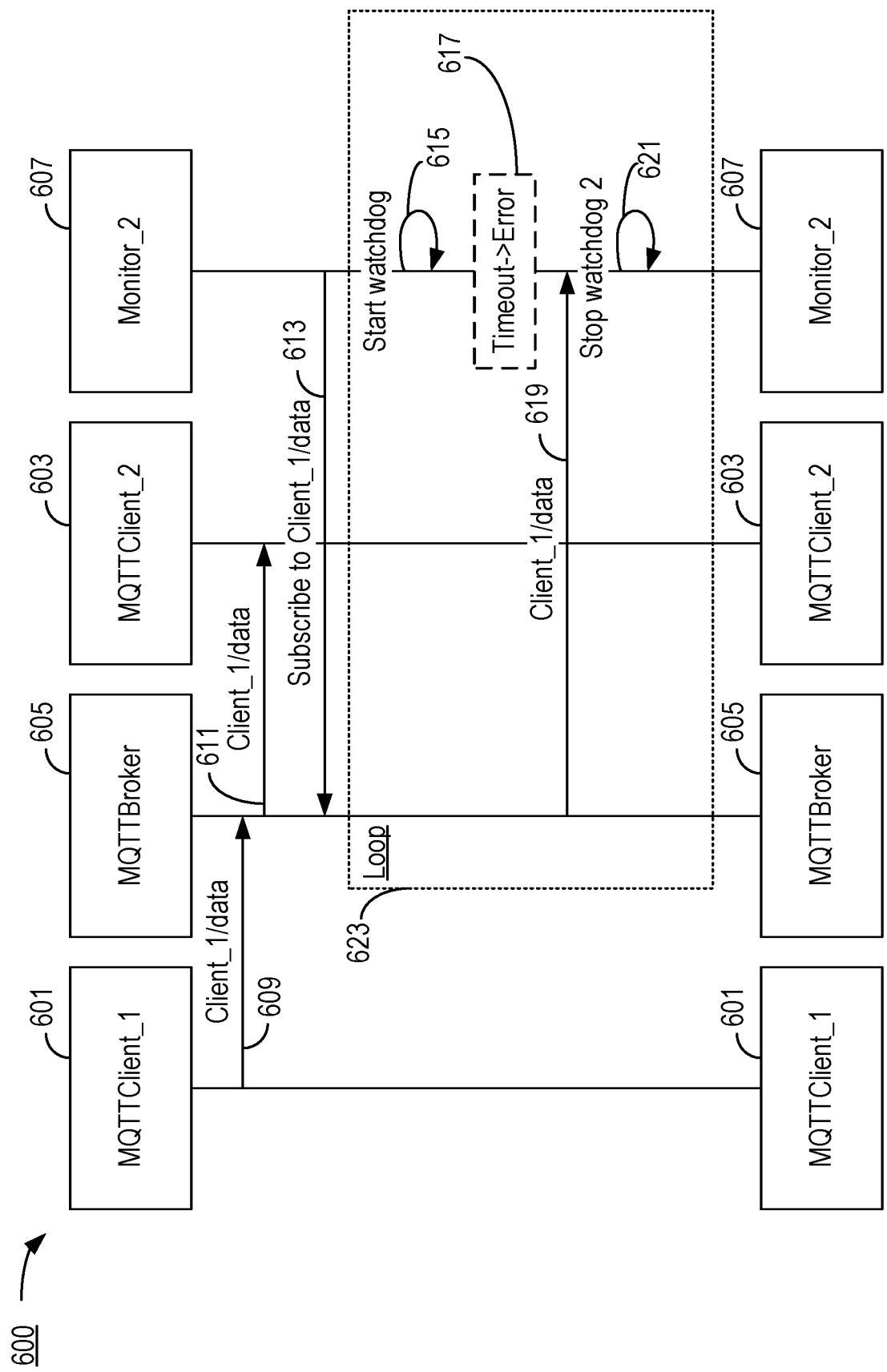
FIG. 6 illustrates a signaling diagram of an alternative embodiment consistent with the invention for monitoring an end-to-end connection between a first client and a second client.

FIG. 6 illustrates a signaling diagram of an alternative embodiment consistent with the invention for monitoring an end-to-end connection in a computing environment 600. This class of embodiments is useful when a client at one end of the end-to-end connection publishes data with regularity and with a known period. In the example of FIG. 6, a first client 601 regularly publishes data (step 609) to a broker 605 at a known periodicity, and a second client 603 subscribes to that data and accordingly receives it (step 611).

In order to monitor the functionality of the end-to-end connection between the first and second clients 601, 603, a monitor 607 is activated in a same node as the second client 603 when the second client 603 is activated. The monitor 607 is configured to subscribe to the data published by the first client 601 (step 613). The monitor 607 then starts a watchdog timer (step 615) that counts up or down and issues a timeout when a predetermined value has been reached in the count. In the event of a timeout, error processing is invoked (step 617).

If the monitor 607 receives data from the first client 601 (step 619) then it is concluded that the end-to-end connection functionality is continuing to operate properly and the watchdog timer is accordingly reset (step 621). The monitor's processing then returns to the top of the loop 623 and repeats the activities just described.

Figure 7:
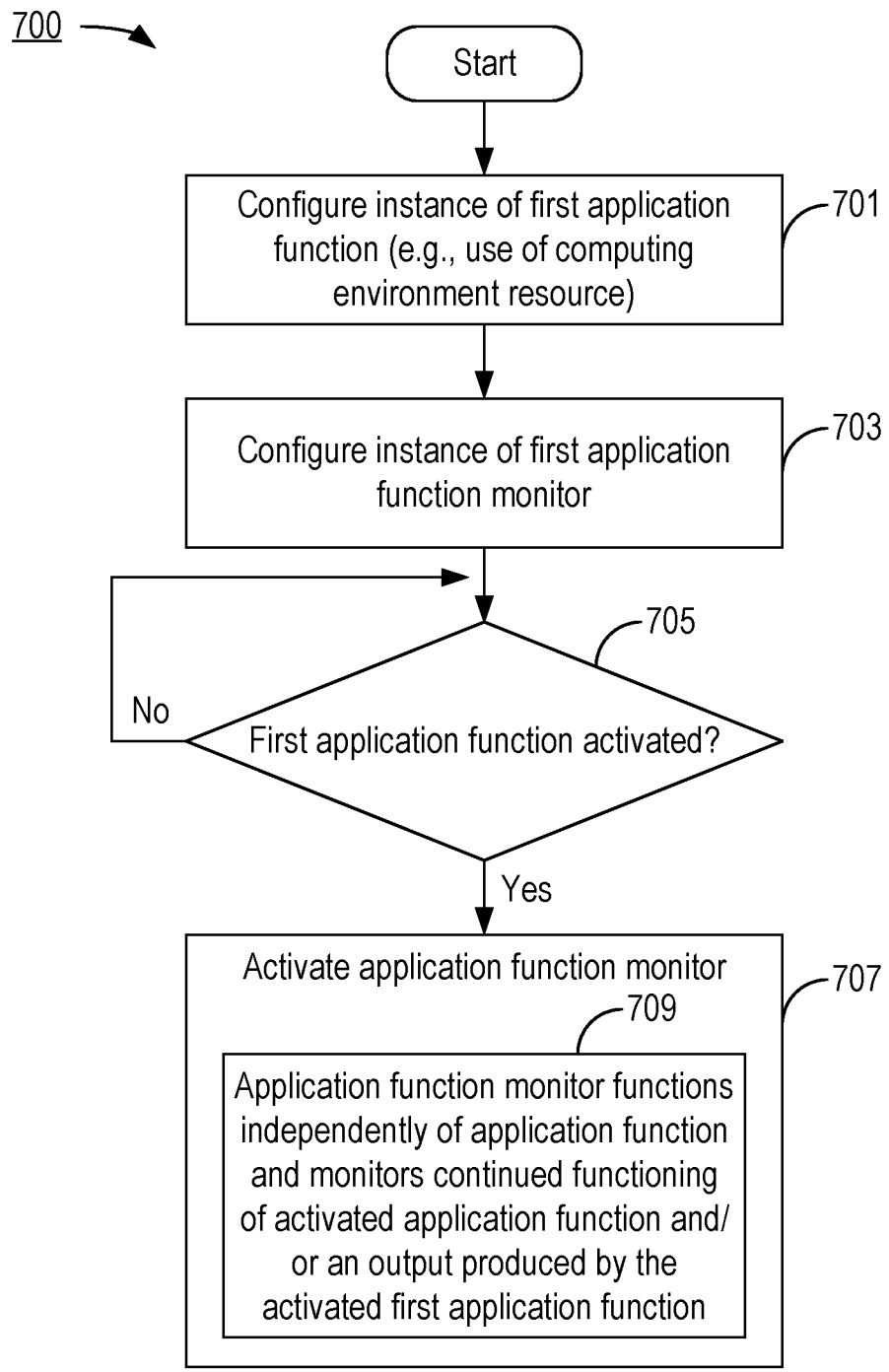
FIG. 7 is, in one respect, a flowchart of actions performed by a system in accordance with a number of embodiments.

Further aspects of embodiments consistent with the invention will now be described with reference to FIG. 7 which is, in one respect, a flowchart of actions performed by the system in accordance with a number of embodiments. In other respects, the blocks depicted in FIG. 7 can also be considered to represent means 700 (e.g. hardwired or programmable circuitry or other processing means) for carrying out the described actions.

The illustrated embodiments enable the monitoring of functionality of an application in a computing environment. As shown in FIG. 7, the process includes configuring (step 701) an instance of a first application function in the computing environment and also configuring (step 703) an instance of an application function monitor in the computing environment. Merely configuring the first application function and the application function monitor does not activate functionality. Accordingly, no further actions are taken so long as the first application function has not been activated ("No" path out of decision block 705).

However, when (if) the first application function is activated ("Yes" path out of decision block 705) the application function monitor is activated in response to the activation of the first application function (step 707). Further in these embodiments, the instance of the first application function and the instance of the application function monitor operate independently of one another when activated, and the application function monitor, when activated, monitors one or more of a continued functioning of the activated first application function; and an output produced by the activated first application function (step 709).

Figure 8:
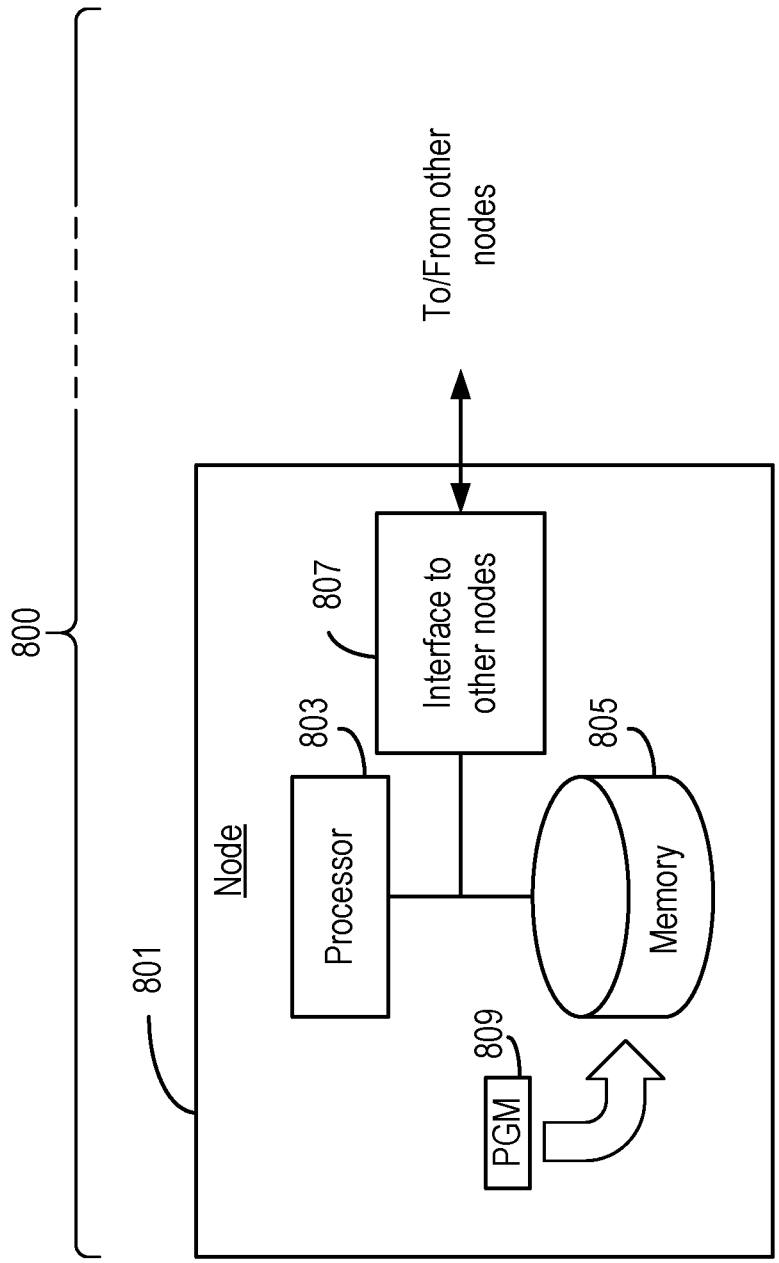
FIG. 8 is a block diagram of an exemplary node or other computing environment that may be configured to cause performance of actions associated with decentralized monitoring of application functionality in a computing environment.

Aspects of an exemplary node 801 or other computing environment 800 that may be configured to cause performance of any and/or all of the above-described actions as discussed in the various embodiments consistent with the invention are shown in FIG. 8. In particular, the node 801 includes circuitry configured to carry out any one or any combination of the various functions described above. Such circuitry could, for example, be entirely hard-wired circuitry (e.g., one or more Application Specific Integrated Circuits—"ASICs"). Depicted in the exemplary embodiment of FIG. 8, however, is programmable circuitry, comprising a processor 803 coupled to one or more memory devices 805 (e.g., Random Access Memory, Magnetic Disc Drives, Optical Disk Drives, Read Only Memory, etc.) and to an interface 807 that enables bidirectional communication with other nodes (i.e., if the exemplary node 801 is configured to operate in a distributed computing environment). The memory device(s) 805 store program means 809 (e.g., a set of processor instructions) configured to cause the processor 803 to control other system elements so as to carry out any of the aspects described above. The memory device(s) 805 may also store data (not shown) representing various constant and variable parameters as may be needed by the processor 803 and/or as may be generated when carrying out its functions such as those specified by the program means 809.

It will be appreciated that in all embodiments consistent with the invention, and advantages provided in that the monitoring functionality only needs to be implemented once and can then be reused and redeployed.

In another advantage, inventive embodiments make it possible to easily obtain fine-grained, case-by-case monitoring and error handling of ad hoc developed systems. Moreover, once implemented, the monitoring and error handling functions are easily reusable in generic platform systems.

Further, by having monitoring and error handling decoupled from the application, inventive embodiments also enable the use of tailor-made implementations for individual hosts/runtimes.

And in another advantage, systems that employ monitoring in accordance with inventive embodiments are easily updated with newer/better implementations of monitoring components without disrupting an existing application whose functions are being monitored.

And in still another advantage, inventive embodiments make it possible to reconfigure a system by, for example, turning off some aspects of monitoring for any reason (e.g., to respond to a shortage of memory, or to save energy).

The invention has been described with reference to particular embodiments. However, it will be readily apparent to those skilled in the art that it is possible to embody the invention in specific forms other than those of the embodiments described above. Thus, the described embodiments are merely illustrative and should not be considered restrictive in any way. The scope of the invention is further illustrated by the appended claims, rather than only by the preceding description, and all variations and equivalents which fall within the range of the claims are intended to be embraced therein.

The invention claimed is:

1. A method of monitoring functionality of an application in a computing environment, the method comprising:
configuring an instance of a first application function in the computing environment;
configuring an instance of an application function monitor in the computing environment; and
activating the application function monitor in response to an activation of the first application function,
wherein the instance of the first application function and the instance of the application function monitor operate independently of one another when activated, and
wherein the application function monitor, when activated, monitors one or more of:
a continued functioning of the activated first application function; and
an output produced by the activated first application function,
wherein:
the computing environment is a distributed environment comprising a first client and a second client that communicate with one another via a messaging system; and
the first application function and application function monitor are activated in the first client of the computing environment.

2. The method of claim 1, wherein the first application function is use of a resource that is provided in the computing environment.

3. The method of claim 1, wherein the resource is a sensor.

4. The method of claim 1, wherein the messaging system is a message broker.

5. The method of claim 1, comprising:
the application function monitor periodically monitoring receipt of a heartbeat signal from the messaging system, wherein the heartbeat signal indicates the continued functioning of the activated first application function.

6. The method of claim 5, comprising:
the application function monitor starting a watchdog timer;
the application function monitor restarting the watchdog timer in response to a receipt of the heartbeat signal from the messaging system; and
the application function monitor activating a first error handling procedure in response to a timeout being indicated by the watchdog timer.

7. The method of claim 6, comprising:
associating an importance level with the first application function; and
setting a timeout value of the watchdog timer in dependence on the importance level of the first application function.

8. The method of claim 1, comprising:
the first application function communicating data to a second application function via the messaging system, wherein the second application function is activated in the second client; and
the application function monitor receiving the communicated data from the messaging system.

9. The method of claim 8, comprising:
the application function monitor detecting when the received data differs from predefined acceptable data, and activating a second error handling procedure in response to said detecting.

10. The method of claim 1, wherein the first application function is a sensor function.

11. The method of claim 1, wherein the computing environment is a distributed computing environment, and wherein the first client is associated with a first node of the distributed computing environment, and the second client is associated with a second node of the distributed computing environment.

12. A non-transitory computer readable storage medium comprising instructions that, when executed by at least one processor, causes the at least one processor to carry out a method of monitoring functionality of an application in a computing environment, wherein the method comprises:
configuring an instance of a first application function in the computing environment;
configuring an instance of an application function monitor in the computing environment; and
activating the application function monitor in response to an activation of the first application function,
wherein the instance of the first application function and the instance of the application function monitor operate independently of one another when activated, and
wherein the application function monitor, when activated, monitors one or more of:
a continued functioning of the activated first application function; and
an output produced by the activated first application function,
wherein:
the computing environment is a distributed environment comprising a first client and a second client that communicate with one another via a messaging system; and
the first application function and application function monitor are activated in the first client of the computing environment.

13. An apparatus for monitoring functionality of an application in a computing environment, the apparatus comprising:
circuitry configured to configure an instance of a first application function in the computing environment;
circuitry configured to configure an instance of an application function monitor in the computing environment; and
circuitry configured to activate the application function monitor in response to an activation of the first application function,
wherein the instance of the first application function and the instance of the application function monitor operate independently of one another when activated, and
wherein the application function monitor, when activated, monitors one or more of:

a continued functioning of the activated first application function; and an output produced by the activated first application function wherein:

the computing environment is a distributed environment comprising a first client and a second client that communicate with one another via a messaging system; and the first application function and application function monitor are activated in the first client of the computing environment.

14. The apparatus of claim 13, wherein the first application function is use of a resource that is provided in the computing environment.

15. The apparatus of claim 13, wherein the resource is a sensor.

16. The apparatus of claim 13, wherein the messaging system is a message broker.

17. The apparatus of claim 13, comprising:

the application function monitor configured to periodically monitor receipt of a heartbeat signal from the messaging system, wherein the heartbeat signal indicates the continued functioning of the activated first application function.

18. The apparatus of claim 17, comprising:

the application function monitor configured to:

start a watchdog timer;

restart the watchdog timer in response to a receipt of the heartbeat signal from the messaging system; and activate a first error handling procedure in response to a timeout being indicated by the watchdog timer.

19. The apparatus of claim 18, further configured to:

associate an importance level with the first application function, and wherein the application function monitor is configured to set a timeout value of the watchdog timer in dependence on the importance level of the first application function.

20. The apparatus of claim 13, comprising:

the first application function configured to:

communicate data to a second application function via the messaging system, wherein the second application function is activated in the second client; and receive the communicated data from the messaging system.

21. The apparatus of claim 20, comprising:

the application function monitor configured to detect when the received data differs from predefined acceptable data, and activate a second error handling procedure in response to said detection.

22. The apparatus of claim 13, wherein the first application function is a sensor function.

23. The apparatus of claim 13, wherein the computing environment is a distributed computing environment, and wherein the first client is associated with a first node of the distributed computing environment, and the second client is associated with a second node of the distributed computing environment.

* * * * *